(No Model.)
A. DUREY & L. SCHREINER.
BICYCLE.
No. 589,941.  Patented Sept. 14, 1897.
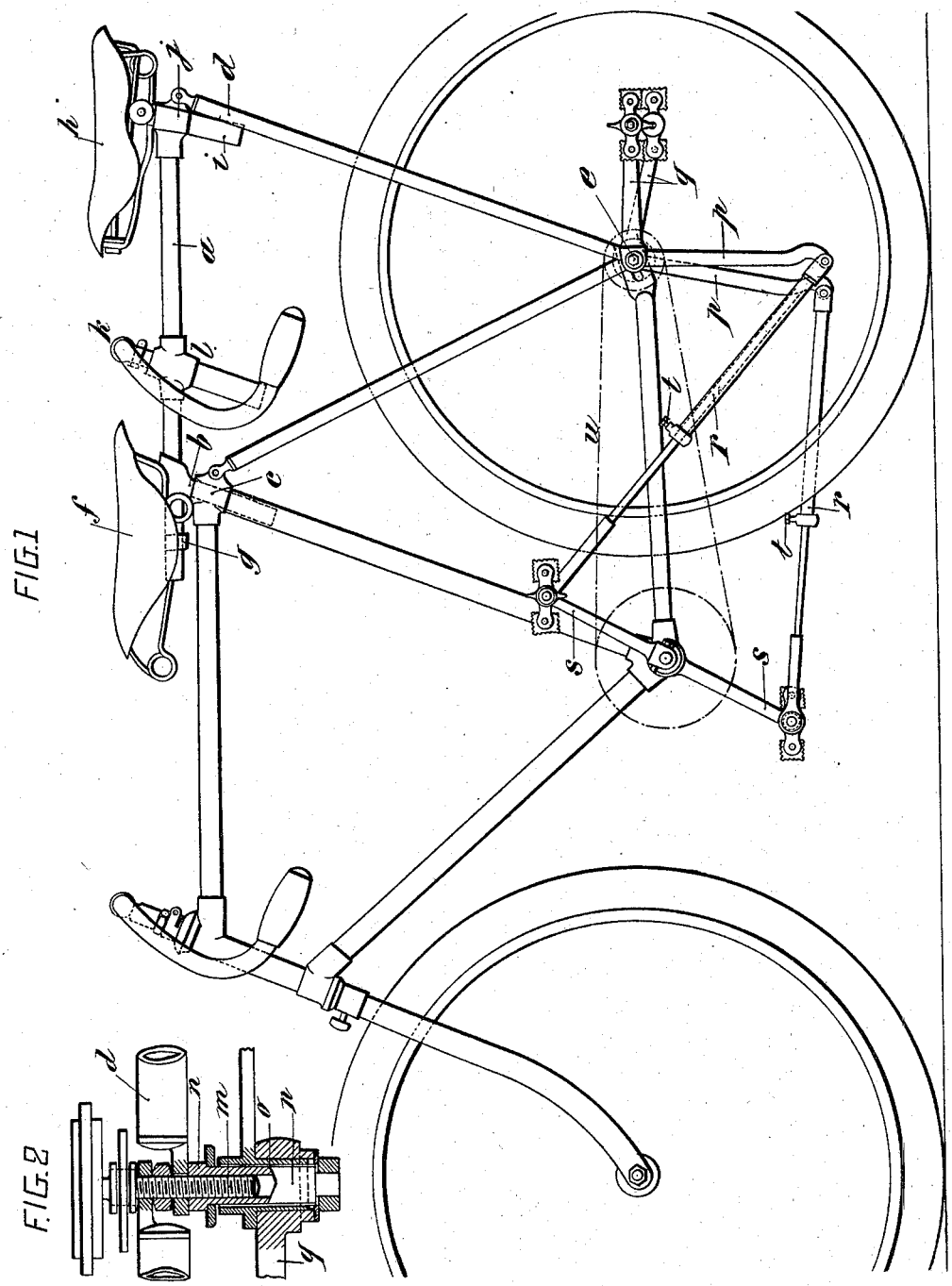

UNITED STATES PATENT OFFICE.

ARTHUR DUREY AND LOUIS SCHRÉINER, OF PARIS, FRANCE, ASSIGNORS TO THEMSELVES AND ALBERT ELKAN, OF SAME PLACE.

BICYCLE.

SPECIFICATION forming part of Letters Patent No. 589,941, dated September 14, 1897.

Application filed January 22, 1896. Serial No. 576,621. (No model.)

*To all whom it may concern:*

Be it known that we, ARTHUR DUREY and LOUIS SCHRÉINER, of the city of Paris, France, have invented Improvements in Bicycles, of which the following is a full, clear, and exact description.

This invention has for its object to enable a safety-bicycle to be readily converted into a tandem bicycle or a tandem into a triplet, and so on, and to enable the machine to be returned to its original form without injury to the appearance of the machine.

Reference is to be had to the accompanying drawings, forming part of this specification, wherein—

Figure 1 represents a safety-bicycle converted into a tandem bicycle for two riders. Fig. 2 is a section showing the means whereby the spindle of the rear wheel is prolonged to receive pedal-cranks.

$a$ is an extension of the upper member of the diamond frame supported at its front end in the socket $b$ of the seat-pillar, mounted in the socket $c$, and at its rear end by being hinged to a fork $d$, whose lower ends are fixed upon the extensions $e$ of the rear-wheel spindle. The clamp $g$ of the front saddle $f$ is fixed upon the end of the extension-bar $a$, while the rear end of said bar has a socket $j$ to receive the pillar $i$ of the saddle $h$. The bar $a$ is also provided with an intermediate socket $l$ to receive the pivot of the handle-bar $k$, which may either be connected with the front steering-handle by a link or be a dummy, as shown. The extensions $e$ of the rear-wheel spindle, on which the extra fork $d$ is supported, are formed as shown in Fig. 2. For this purpose upon each of the screw-threaded ends $m$ of the spindle is screwed a tubular nut $n$, upon which is pivoted the socket $o$ of a lever-arm $p$, upon which socket is also fixed another lever-arm $g$, forming the pedal-crank arm, the two arms $p$ $g$ forming an elbow-lever. The lever-arm $p$ is connected to the corresponding front pedal $s$ by means of a rod $r$, so that motion will be transmitted from pedal-crank $g$ to pedal-crank $s$, the length of the lever-arm $p$ relatively to the crank $s$ and the relative positions of the front and rear pedals being such that the rear pedal, which is only capable of upward and downward oscillation through an arc of forty-five degrees, will assist the front crank at the dead-point, and so equalize the motion. The connecting-rods $r$, when placed as shown, work in compression; but if it is desired they should work in tension it is only necessary to reverse the position of the levers, so that the levers are upward. The connecting-rods are made in two parts, sliding one on the other and secured by a set-screw $t$, so as to enable their length to be adjusted to suit the tension-adjustment of the driving-chain $u$.

In order to reconvert a tandem into a single bicycle, it is only necessary to detach the supplementary bar $a$, extra rear fork $d$, pedal-cranks $g$, levers $p$, and connecting-rods $r$. The rear-saddle pillar is then placed in socket $c$, and there then only remains to remove the sockets from the ends of the rear-wheel spindle in order to restore the bicycle to its original form.

In order to avoid changing the saddles, as above mentioned, the front saddle may be fixed vertically by providing it with a shank. The socket $b$ would be split and tightened by a bolt to grip the extension-bar $a$.

We claim—

The combination with a bicycle provided with rotary-pedal driving mechanism, of an extension-bar $a$ of the frame having a socket $b$ at its front and socketed and supported in the front-seat pillar of the bicycle, an extra fork $d$ fixed at its lower end on the rear-wheel spindle $e$, and pivoted to and supporting the rear end of the extension-bar $a$, and of up and down oscillating pedal-cranks $q$, the said cranks not performing a full rotation and lever-arms $p$ carried upon nuts $n$ upon the extensions $e$ of the rear-wheel spindle, and adjustable links $r$ pivoted to and connecting the lever-arms $p$ to the rotary pedals of the bicycle, whereby the up-and-down movement of the oscillating pedals will be effective to carry the rotary cranks over their dead-points.

The foregoing specification of our improvements in bicycles signed by us this 8th day of January, 1896.

ARTHUR DUREY.
LOUIS SCHRÉINER.

Witnesses:
CLYDE SHROPSHIRE,
ALBERT MOREAU.